US012591992B2

(12) United States Patent
Danescu et al.

(10) Patent No.: US 12,591,992 B2
(45) Date of Patent: Mar. 31, 2026

(54) METHOD FOR MEASURING AND ANALYZING PACKAGES FOR STORAGE

(71) Applicant: DEXORY LIMITED, London (GB)

(72) Inventors: Andrei Danescu, London (GB);
Adrian Negoita, London (GB);
Matthew MacLeod, London (GB)

(73) Assignee: DEXORY LIMITED (GB)

( * ) Notice: Subject to any disclaimer, the term of this patent is extended or adjusted under 35 U.S.C. 154(b) by 313 days.

(21) Appl. No.: 18/038,085

(22) PCT Filed: Nov. 23, 2021

(86) PCT No.: PCT/GB2021/053033
§ 371 (c)(1),
(2) Date: May 22, 2023

(87) PCT Pub. No.: WO2022/106858
PCT Pub. Date: May 27, 2022

(65) Prior Publication Data
US 2024/0005543 A1    Jan. 4, 2024

(30) Foreign Application Priority Data
Nov. 23, 2020    (GB) ..................................... 2018384

(51) Int. Cl.
G06T 7/62        (2017.01)
B25J 9/16        (2006.01)
(Continued)

(52) U.S. Cl.
CPC .............. G06T 7/62 (2017.01); B25J 9/1697 (2013.01); B64U 10/60 (2023.01); G01B 11/04 (2013.01); B64U 2101/30 (2023.01)

(58) Field of Classification Search
CPC .......... G06T 7/62; B25J 9/1697; B64U 10/60; B64U 2101/30; G01B 11/04; G01B 11/00;
(Continued)

(56) References Cited

U.S. PATENT DOCUMENTS 11,430,148 B2    8/2022 Cumoli et al.
2018/0178667 A1    6/2018 Cumoli et al.
(Continued)

FOREIGN PATENT DOCUMENTS

CN        110634140 A    12/2019
CN        111696152 A    9/2020
(Continued)

OTHER PUBLICATIONS

Search Report issued in International Application No. PCT/GB2021/053033, May 27, 2022.
(Continued)

*Primary Examiner* — Jerome Grant, II
(74) *Attorney, Agent, or Firm* — The Belles Group, P.C.

(57) ABSTRACT

A method for measuring and analysing packages particularly for optimising storage in a warehouse or for packing for transporting. The method follows the steps of placing packages on a floor surface moving a robot to adjacent one of the packages. Lidar or similar is used to measuring distance data from the robot to the package at a multiple heights from at least 0.5 m above the floor surface. The robot then follows a path around all or part of the packages gathering further distance data as it travels. The distance data is then used to determine or infer the shape of the sides of the package and from their estimate volumetric dimensions of the package. The volumetric dimensions are then used to optimise storage of the package with other packages.

19 Claims, 9 Drawing Sheets

(51) Int. Cl.
  *B64U 10/60*    (2023.01)
  *G01B 11/04*    (2006.01)
  *B64U 101/30*    (2023.01)

(58) Field of Classification Search
  CPC .... G01B 11/02; G01B 11/026; G05D 1/0094;
                 G01F 17/00
  USPC ........................................................ 382/106
  See application file for complete search history.

(56)       References Cited

U.S. PATENT DOCUMENTS

| | | | |
|---|---|---|---|
| 2019/0073839 A1 | 3/2019 | Okamura | |
| 2019/0197716 A1 | 6/2019 | Trajkovic et al. | |
| 2020/0302632 A1 | 9/2020 | Oh | |
| 2022/0126452 A1 * | 4/2022 | Pennington | ............ B25J 9/1682 |

FOREIGN PATENT DOCUMENTS

| | | | | |
|---|---|---|---|---|
| EP | 3343510 A1 | 7/2018 | | |
| WO | WO-2020129120 A1 * | 6/2020 | ........... | G01S 7/4972 |

OTHER PUBLICATIONS

Search Report from the UK IPO dated Jul. 23, 2021 issued in Application No. GB2018384.4.
Combined Search and Examination Report from the UK IPO dated Jul. 26, 2021 issued in Application No. GB2018384.4.

\* cited by examiner

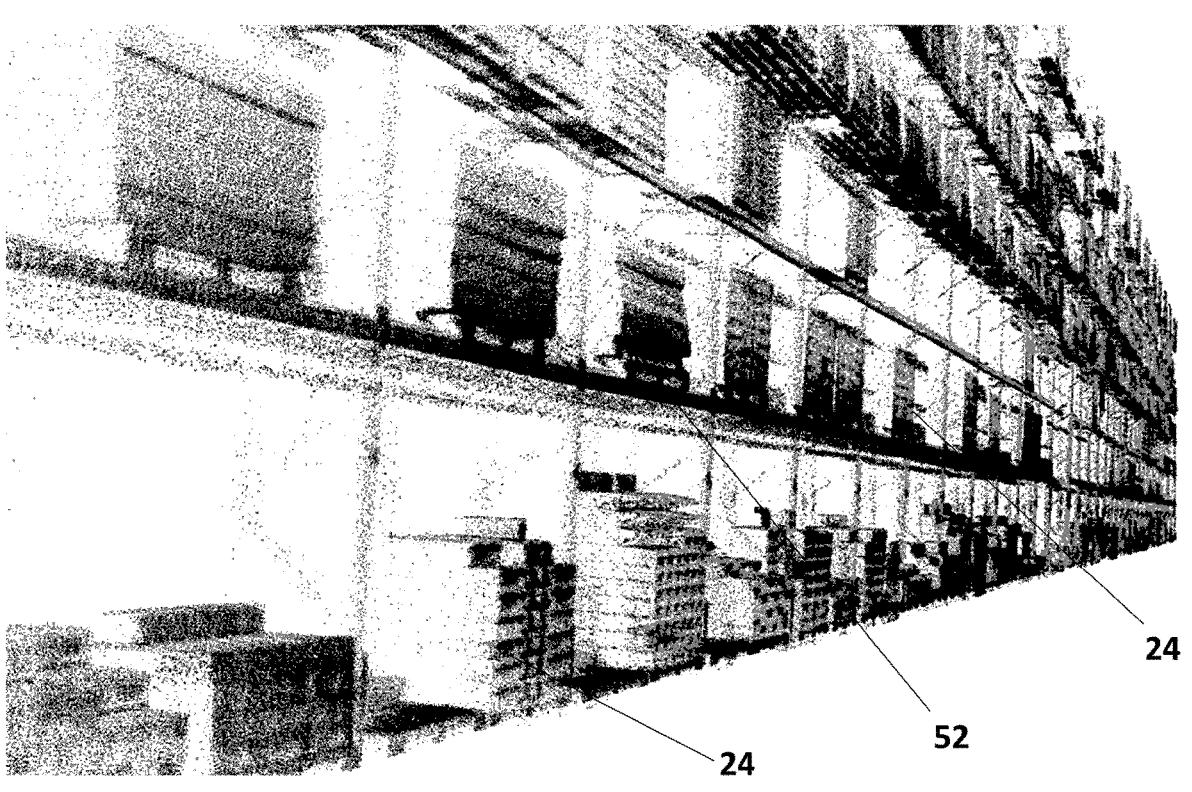
24
52
24
Figure 10A.
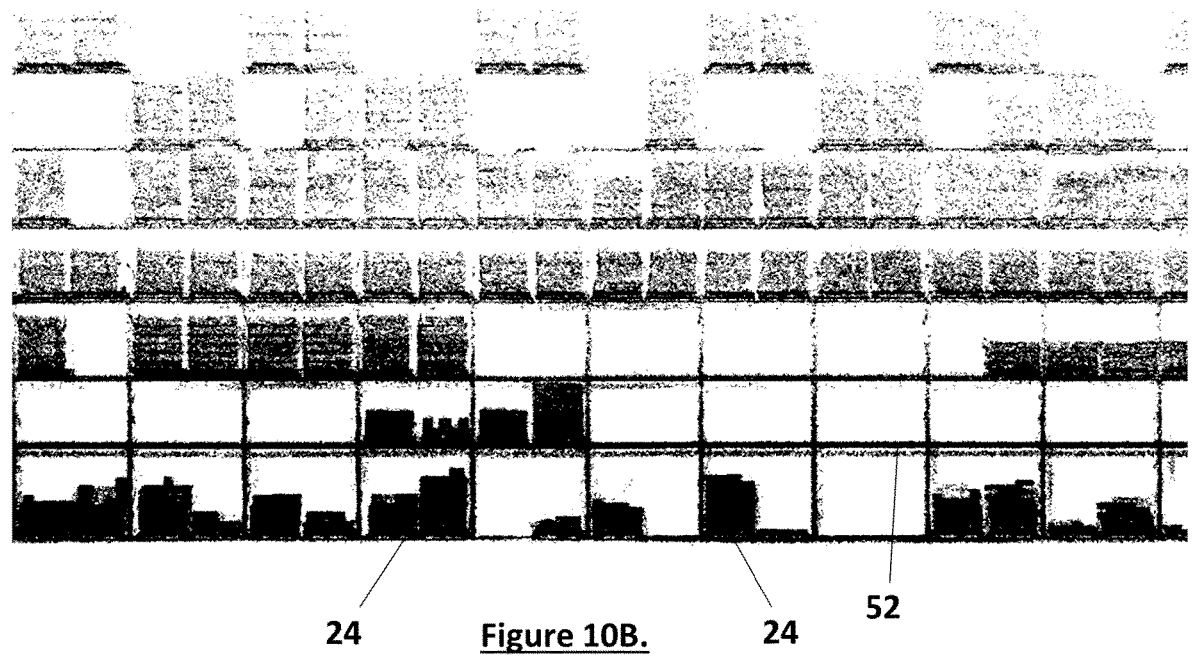
24        Figure 10B.        24        52

22

14B

20

10

17B

17B

17B

14A

18

16

METHOD FOR MEASURING AND ANALYZING PACKAGES FOR STORAGE

CROSS-REFERENCE TO RELATED PATENT APPLICATIONS

The present application is a U.S. national stage application under 35 U.S.C. § 371 of PCT Application No. PCT/GB2021/053033 filed Nov. 23, 2021, which claims priority to United Kingdom Patent Application No. 2018384.4 filed Nov. 23, 2020. The disclosures of the aforementioned priority applications are incorporated herein by reference in their entireties.

The present invention relates to a method for measuring packages for optimising storage and relates particularly, but not exclusively, to a method of operating a robot that efficiently gathers data for storage allocation of a package in a warehouse or for transportation.

Scanning packages and parcels for the purposes of identification in a warehouse environment and the like is well known. This practice is mainly used to log, via barcodes, QR-codes and the like, what packages have arrived, so they can be allocated a space for storage and for later retrieval or for transit. This in general can be a slow process due to warehouse workers having to gain an understanding of the layout of the warehouse and where a space may be free.

There are methods of using a static camera with sensors able to scan packages and measure their volume within a 3D scanning bay. However, this is also a slow and cumbersome process. The package is either manoeuvred and manipulated beside the camera so measurements of all sides can be taken or a user has to carry the camera around the package. This also leads to a backlog of packages. In general, many packages will arrive to the warehouse simultaneously and with only a single scanning camera this can lead to a long procedure. Scanning bays are also static and involve taking all packages through it for volumetric compliance, leading to further backlogs.

When packages are being delivered or shipped via a shipping container or aircraft hold, the space available to contain the packages is at a premium. When stacking packages within these holds being unaware of the volume or shapes of the package can make arrangement difficult. It takes an increased amount of time for employees to decide on the number of packages that can be transported and how they can be stacked. If this is not performed effectively, the containers will not be filled to capacity leading to loss of revenue through non deliverables, time taken to stack and wasted space. This also increases the environmental impact of deliveries. With more containers needed there is an increase in the number of journeys that lorries, ships or aircraft need to take.

An example of the prior art is disclosed in EP3343510. This document discloses a system for analysing the dimensions of packages using drones operating in a predefined area. The use of drones is extremely complex in an indoor area. It also slows down the operation as articles have to be placed in a specific area for analysis.

Preferred embodiments of the present invention seek to overcome or alleviate the above described disadvantages of the prior art.

According to an aspect of the present invention there is provided a method for measuring and analysing packages, comprising the steps:

placing a plurality of first packages onto a floor surface;

locating at least one floor surface engaging robot adjacent at least one said first package;

using a distance measuring device to gather data of distance from said robot to the first package at a plurality of heights, when in use said distance measuring device being connected to said robot in use at least 0.5 m above said floor surface;

moving said robot from a first location to a second location around at least a portion of the first package along a path and gathering further distance data at a plurality of heights and a plurality of locations along said path;

using said robot locations and said distance data to generate volumetric dimensions of the first package.

By using a robot with a scanning device located at least 0.5 m above the floor surface the advantage is provided that the robot is able to scan data from at least two sides of a package and a top surface which allows an interpretation of the data gathered to be made to estimate the volumetric dimensions of the object being scanned. This is particularly important where palleted packages are arriving at a warehouse for storage and redistribution. As packages are unloaded and their pallets placed on to the floor in a loading area the robots can autonomously move around a series of packages and scan multiple packages without having to gain access to all sides of the package. As a result, and as will be illustrated later, packages can be simply unloaded in a normal fashion and placed adjacent to one another. The robot then autonomously follows a path around the objects and is able to scan each of them in spite of being unable to gain access to the adjacent sides of adjacent packages. The normal operation of the warehouse is therefore not interrupted by the scanning process.

In a preferred embodiment the path from said first location to said second location substantially encircles said plurality of first packages and volumetric data is gathered for all said first packages.

In another preferred embodiment the volumetric data is calculated using shape data of sides of said first package, said shape data generated from said distance data for at least two sides of said first package proximal to said path and is generated from edge data for at least one edge distal of said path.

The method may further comprise, on arrival at the second said second location, causing said distance measuring device to rotate towards said first package and continuing to gather distance data during said rotation.

By rotating towards the package at the end of the path, that is on arrival at the second location, the advantage is provided that the distance measuring device is able to scan across the whole of a side which may have been only partially scanned due to access restrictions.

The method may further comprise identifying an identifying tag attached to said package.

The method may also further comprise comparing said volumetric dimensions to other volume data for said first packages to determine compliance and/or damage.

In a preferred embodiment the distance measuring device is fixed to said robot at a height of at least 1.5 m above floor engaging wheels of said robot.

In another preferred embodiment the said height is at least 1.7 m.

In a further preferred embodiment the distance measuring device comprises at least one Lidar device.

In a preferred embodiment the placing step comprises unloading said first packages from a vehicle onto said floor surface.

In another preferred embodiment the at least one first package comprises a plurality of first packages.

In a further preferred embodiment the first package comprises a least one item located on a pallet.

In a preferred embodiment the volumetric dimensions are generated using data from at least two substantially vertical surfaces and a top surface.

According to another aspect of the present invention there is provided method for optimising package storage for a first package in a storage area containing other packages, comprising the steps:

measuring and analysing packages according to any preceding claim; and using said volumetric dimensions to establish a storage location in the storage area where the first package can be stored amongst the other packages.

The method may further comprise directing said robot along a storage area path in said storage area, said robot gathering distance data relating to storage locations and determining whether said storage locations are occupied or free to receive packages.

According to another aspect of the present invention there is provided a method for optimising package storage for a first package in a storage area containing other packages, comprising the steps:

placing a first package in a scanning area;

gathering data of distance from a robot to the first package at a plurality of heights;

moving said robot around the first package along a path and gathering further distance data at a plurality of locations along said path;

using said robot locations and said distance data to generate volumetric dimensions of the first package; and using said volumetric dimensions to establish a storage location in the storage area where the first package can be stored amongst the other packages.

Unlike handheld scanners that require staff training for handling or bays that require staff, a robot can easily move around assets and scan them with no human overhead. This decreases the time taken to scan such packages and increase the productivity of staff.

Having an efficient and effective storage procedure further decreases the time it takes to move and allocate space for packages. This further decreases the time staff take to find a space and can maximize the number of packages held at a warehouse. This method also decreases the resources spent to ship packages by increasing the number of packages delivered via shipping containers or aircraft. Additionally, this decreases the environmental impact by utilising fewer shipments, therefore decreasing the carbon footprint on vehicles, ships and planes.

The distance data is preferably gathered using at least one of LIDAR, RGBD, RGB and stereo cameras on said robot.

In a preferred embodiment the path is marked on a surface of said scanning area and said robot uses a surface mark detector to detect said mark and instruct the robot to follow said path.

In another preferred embodiment the path is programmed into said robot.

In a preferred embodiment the path is calculated from the movement of the robot.

An autonomous robot does not require a user to control it or a user to paint on or embed a path around a package, further increasing the productivity of staff members, decreasing costs and enabling robots to scan anywhere in the warehouse where the package can be placed on a suitable surface.

The storage location may be determined depending on the expected time that the package will remain in the storage area.

Where a number of packages are stored at a warehouse only for a short time, these packages will be stored near to a loading bay and at a quick and accessible height. Therefore, knowing the time a package needs to spend at a location is beneficial and allows for a quick turnaround for short stay packages with those that are for longer term storage being located in less accessible places.

In a preferred embodiment the scanning is implemented using an unmanned aerial vehicle (UAV) with a camera attached, wherein said UAV is tethered to said robot.

According to a further aspect of the present invention there is provided a robot for scanning a package comprising:

a housing;

drive means for locomotion of the robot;

at least one distance measuring device for measuring a distance from the device to an object; and at least one height varying device for varying the height of the distance measuring device relative to the housing.

In a preferred embodiment the at least one height varying device comprises an unmanned aerial vehicle wherein said unmanned aerial vehicle is tethered to the housing.

In an alternative preferred embodiment the at least one height varying device comprises a telescopic pole extending from said housing.

In a preferred embodiment the drive means for locomotion comprises driven wheels and wherein said wheels are located on the housing adjacent the floor.

In another preferred embodiment the unmanned aerial vehicle comprises a drone.

In a further preferred embodiment the unmanned aerial vehicle is tethered via an electrical cable.

Preferred embodiments of the present invention will now be described, by way of example only, and not in any limitative sense with reference to the accompanying drawings in which:—

FIGS. 10A to 10D are examples of data gathered and processed during the operation of the present invention;

Figure 1B:
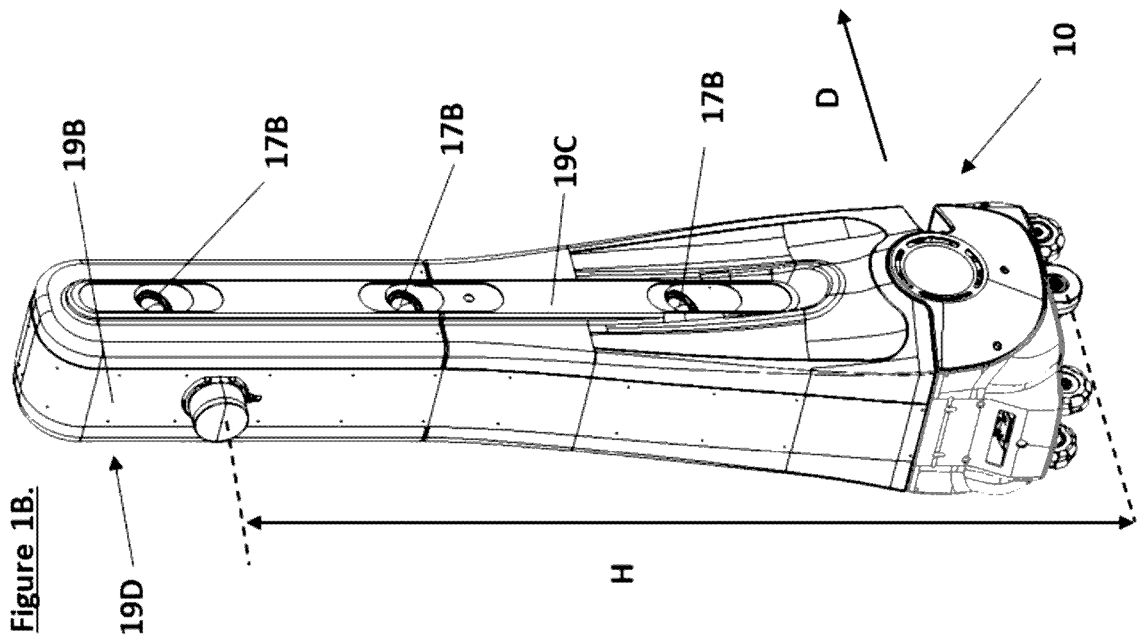
FIGS. 1A and 1B are isometric views of a robot used in the method of the present invention.

The present invention will be described in two related and interchangeable embodiments with both embodiments utilising the same robot (labelled 10). Features disclosed in relation to the first embodiment that are not included in the second embodiment can be used therein and vice versa. The first embodiment is described with reference to FIGS. 1 to 10.

The robot 10 is an autonomous, or semiautonomous, wheeled robot which utilises a wireless connection 11 to communicate with a processor 12, typically a server or cloud-based computing device, to which it supplies data. Although processing is undertaken by processors on the robot 10 and by the processor 12, it is typically the raw data from the robot 10 which is transferred to the processor 12 for processing to generate the detailed analysis explained below. The data from the robot 10 is captured by a sensor array 14 which can be a single sensor or a plurality of different sensors together in the array 14. The sensor array 14 includes a distance measuring device which measures the distance from the sensor array to an object. The sensor array in robot 10 uses a scanning method called light detection and ranging (LiDAR). This technique uses light in the form of a pulsed laser to measure the distance between the emitted light on the robot and a surface on the package. A further receiver sensor on the robot measures the time it takes for the light to reflect off the surface of the package and back to the source. Both solid state and mechanical LiDAR are suitable for use in the robot 10 and other sensors and methods of distance measurement can be used including, but not limited to, RGB cameras, stereo cameras, RGB-D cameras or depth sensors and these sensors can be used in the place of Lidar but most preferably are used in addition. The label 14 is used to generally identify the Lidar sensors arrays which are specifically labelled 14A and 14B as explained below.

The robot 10 moves using wheel 16 which engage a floor surface on which the robot is standing. A body or housing 18 carries the sensor arrays and in the embodiment shown in FIG. 1 there are multiple arrays at different heights above the points of contact where the wheels 16 engage the floor surface. There are also sensor arrays on both the front and rear of the robot 10. The definition of front and rear depends on the direction of travel of the robot and indeed can be interchangeable as the direction of travel changes. In the embodiment shown in FIG. 1, the robot 10 is designed primarily for a single direction of travel as the configuration of the front and back faces are different. However, a robot with identically configured front and rear surfaces could operate in either direction.

The housing 18 has a front face 19A which faces forwards in the standard direction of travel (D). A front Lidar 14A is located in a slot and produces a narrow approximately fan shape spread of laser light beams which are used primarily for the autonomous navigation of the robot. A further sensor in the form of camera 17A is also located on the front face 19A. The camera 17A is a 3D camera and is therefore capable of measuring distances. However, its primary purpose in this embodiment is to assist in with the autonomous navigation supplementing the data gathered by the front Lidar 14A.

A rear face 19B of the robot faces backwards in the standard direction of travel and the main object scanning sensor array 14B containing the main scanning Lidar is located thereon. Side faces 19C (and 19D which is hidden from view in FIGS. 1A and 1B) have further sensor arrays 17B which are 2D cameras which obtain optical images to the side of the robot as it travels along its path. These side mounted cameras can also be 3D cameras which assist in the scanning of shelves and the scanning of the objects or palleted packages while passing by them using the Lidar for scanning. The use of 3D cameras can assist the correct interpretation of the Lidar data. It should also be noted that although in this embodiment the main scanning Lidar 14B is mounted on the rear of the robot it can be front mounted in addition to or instead of the rear mounted sensor array. This additional data increases the accuracy of the volumetric dimensional modelling that is undertaken.

An important aspect of the present invention is the height of the main sensor array 14B above the floor surface (this height is illustrated in FIG. 1B and labelled H). As will be described in greater detail below, it is important that the sensor array 14B is able to "see" the topmost surface of the packages which are being scanned. That is, that the sensor array 14B is able to gather data relating to the dimensions of the topmost surface and these dimensions being most specifically, at least, the edges of that uppermost surface. As a result, the height H must be at least 50 cm, is preferably at least 1 m, is more preferably at least 1.5 m and is ideally 1.7 m. Taller robots allow a greater likelihood for gathering the topmost surface data but begin, as they get taller, to suffer from the disadvantage of increased instability. Stability can be increased by increasing the weight in the base of the robot or increasing the size of the base of the robot around the wheels. However, these compromises come with disadvantages such as increased energy costs, reduced battery life and/or increased production costs due to the need to include larger batteries and decreased manoeuvrability.

When the robot 10 is operating it uses the front facing sensor arrays 14A in order to operate autonomously, that is to move around the floor surface of, for example, a warehouse without bumping into objects or people who are standing in its intended path. The rear facing sensor array 14B, that is the sensor array which is on the back of the robot 10 with respect to the forward motion of the robot, is utilised to measure and analyse the shape of packages. The Lidar aspect of the sensor array 14B produces a plurality of beams of laser light which are used to measure the distance from the sensor array to an object in the path of the laser beam at a plurality of heights. As a result, the Lidar produces a conelike spread of laser beams which have a total spread of approximately 30° (up to 45°), that is approximately 15° to the left and to the right of the direction of travel. In other words, if the laser light beams from the Lidar are imagined forming a cone with the tip of the cone at the sensor and angle between the direction of travel measured from the sensor to a curved face of the cone being 15°. Note that in FIG. 1B, the direction of travel measured from the sensor is indicated by the dotted line extending from the sensor 14B as used to illustrate the height H.

Figures 3, 4, 5:
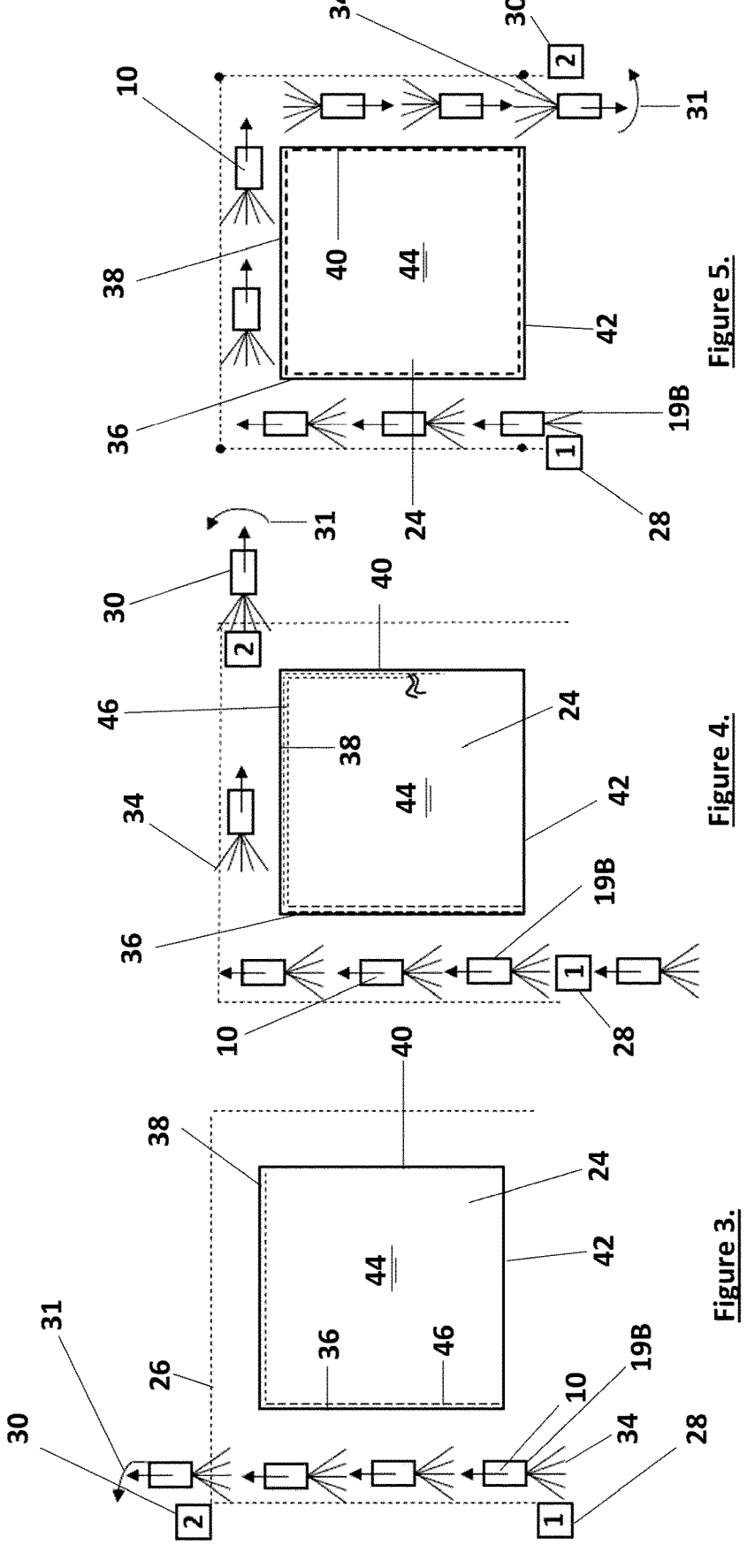
FIGS. 3, 4 and 5 are schematic representations of the robot of FIG. 1 undertaking an operation forming part of the present invention.

With specific reference to FIGS. 3 to 5, these images illustrate the data which can be gathered as the robot 10 travels around an object or package 24. The robot 10 travels along a path 26 from a first location or starting point 28 to a second location or finishing point 30. The sensor array 14B (not labelled on FIGS. 3 to 5) is on the rear side 19B of the robot with respect to the direction of travel D. The Lidar device of the sensor array 14B produces a cone like spread of beams of laser light (indicated as 34 on FIGS. 3 to 5). As can be seen from FIG. 3, when the robot 10 starts in the first location 28 the Lidar of the sensor array 14B is not producing data relating to the object 24 because the sensor array is pointing away from the object. As the robot 10 travels along the path 26 the beams of laser light of the Lidar of the sensor array 14B begin to intersect the first side 36 of the object 24 and, as a result, data relating to that first side is produced. As the robot 10 continues to travel along the path and gets closer to the finishing point 30 data is gathered which when processed produces a detailed image of the first side 36. Once the rear side 19B of the robot 10 has passed the end of the first side 36 the beams of laser light from the Lidar of the sensor array 14B begin to intersect with the second side 38 of the object 24. Because data is only gathered from the point at which the rear side 19B of the robot 10 passes the end of the first side 36 the amount of data is much less and the quality of that data is not as high for the second side 38 when compared to the data gathered for the first side 36. This is in part because the Lidar sensor is only able to gather data for the second side 38 at an oblique angle.

It can therefore be seen that the robot 10 following the path from the starting point 28 to the finishing point 30 as illustrated in FIG. 3 is able to gather very detailed information about the first side 36, somewhat detailed information about the second side 38 but is unable to gather detailed information about the third and fourth sides 40 and 42. However, some information about the third and fourth sides 40 and 42 can be obtained because the height of the robot, and in particular the height of the main scanning sensor array 14B, at height H, is greater than the topmost surface 44 of the object 24. As a result, as the robot 10 passes from the starting point 28 to the finishing point 30 the Lidar sensor is able to gather information about the topmost surface 44 and in particular the edge which connects the third surface 40 and the top surface 44 as well as the edge which connects the fourth surface 42 and the top surface 44. It is then possible to infer information about the third and fourth surfaces 40 and 42 by assuming they are vertical sides, sides of some other shape or sides which are similar to the first and second sides 36 and 38. In FIGS. 3 to 5 the sides in which it is been possible to determine detailed, or at least somewhat detailed, shape information have been highlighted using the dotted line labelled 46. On the sides which do not include this dotted line shape information can only be inferred from data relating to the edge connecting the sides to the top surface 44. With data gathered relating to some sides and the top surface and having determined or inferred the shape of all of the sides 36 to 44, volumetric information, including the overall volume of the object, can be determined. It can therefore be seen that even using a path which follows a straight line along one side of the object 24 volumetric data can be determined.

Referring to FIG. 4, in this illustration the starting point 28 and finishing point 30 are at approximately opposite corners of the object 24. A first portion of the path 26 is the same as that illustrated in FIG. 3 but after the robot 10 has passed the end of the first side 36 it turns clockwise through 90° and continues along a path next to the second side 38 to reach the finishing point 30. In the first part of the path 26 data similar to that in the above embodiment and relating to the first side 36 is gathered. However, by following the path along the second side 38 more detailed information is gathered relating to that side. Because the finishing point 30 extends past the end of the second side 38 some detailed data can be gathered relating to the third side 40. However, only edge data relating to the fourth side 42 can be obtained and the shape of that side must be inferred.

Referring to FIG. 5, in this illustration the starting point 28 and finishing point 30 are located at either end of the fourth side 42. As a result, the path 26 extends along the first side 36, the robot performs a 90° turn and travels along the second side 38 and performs another 90° turn and travels along the third side 40. As a result, very detailed data is gathered in relation to the first, second and third sides (36, 38 and 40) and somewhat detailed information is gathered for the fourth side 42. If the start and end points 28 and 30 were the same and the robot 10 travelled along each of the sides 36 to 42 then fully detailed information about each of the sides would be obtained. However, this is not always possible. For example, a series of objects may be placed next to each other which is typical when multiple palleted objects are being removed from a vehicle or where objects have been placed close to walls or other parts of buildings where access for a robot is restricted or not possible.

In each of the scanning path illustrations in FIGS. 3 to 5, when the robot 10 reaches the end point 30 it undertakes an anti-clockwise rotation before ending the scanning process. This anti-clockwise rotation causes the rear mounted main scanning lidar 14B to rotate towards the object 24 so as to scan across the partially scanned side of the object. In the example illustrated in FIG. 3 that is the second side 38, in FIG. 4 the third side 40 and in FIG. 5 the fourth side 42. As a result, the full spread of the lidar beams is exposed to that previously partially scanned side and this increases the data points available for interpretation of that partially scanned side. The data gathered is not as much as if the robot had passed along the whole of that side but it is more data than if the robot we to rotate clockwise. Although the above rotation is described as a rotational movement of the whole robot, the same result can be achieved by causing the rotation of the sensor 14B relative to the housing 18 of the robot 10. If the scanning is taking place from the rear of the robot then the rotation is anti-clockwise when viewed from above whereas if scanning is from a front mounted device the rotation is clockwise.

Figure 6:
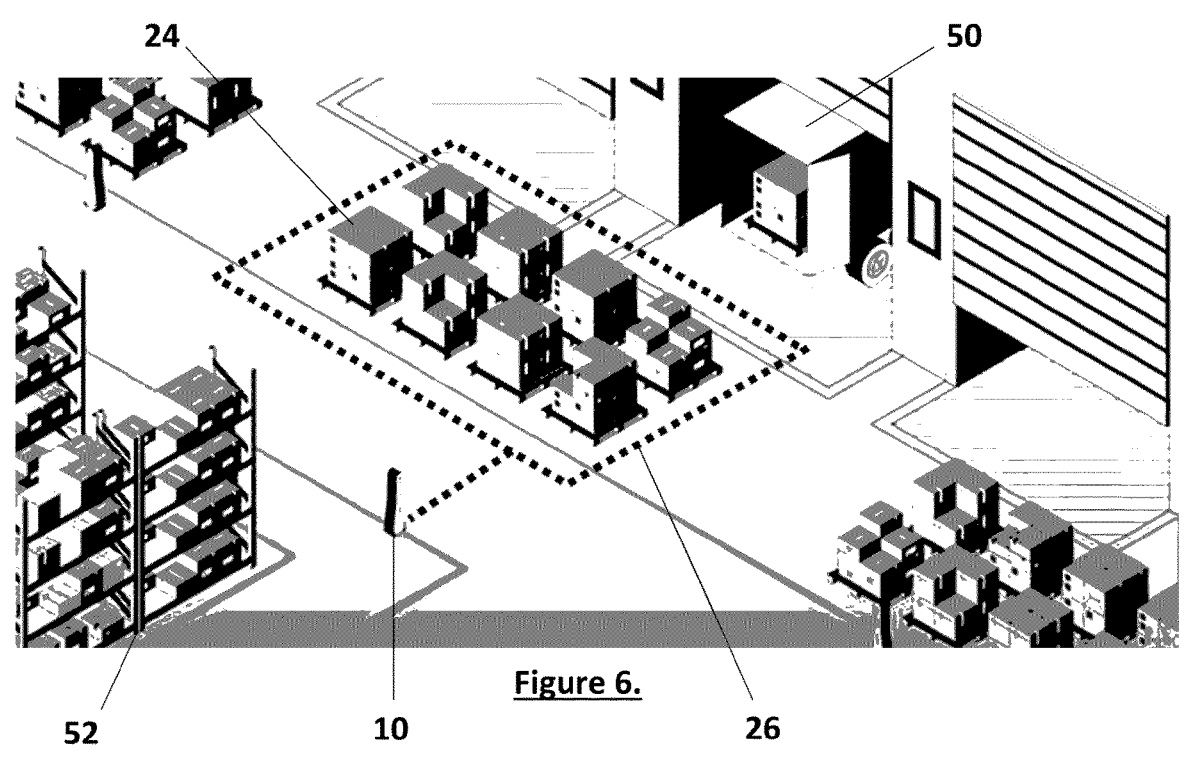
FIGS. 6 and 7 are further schematic representations of the robot of FIG. 1 undertaking an operation forming part of the present invention.
Figure 7:
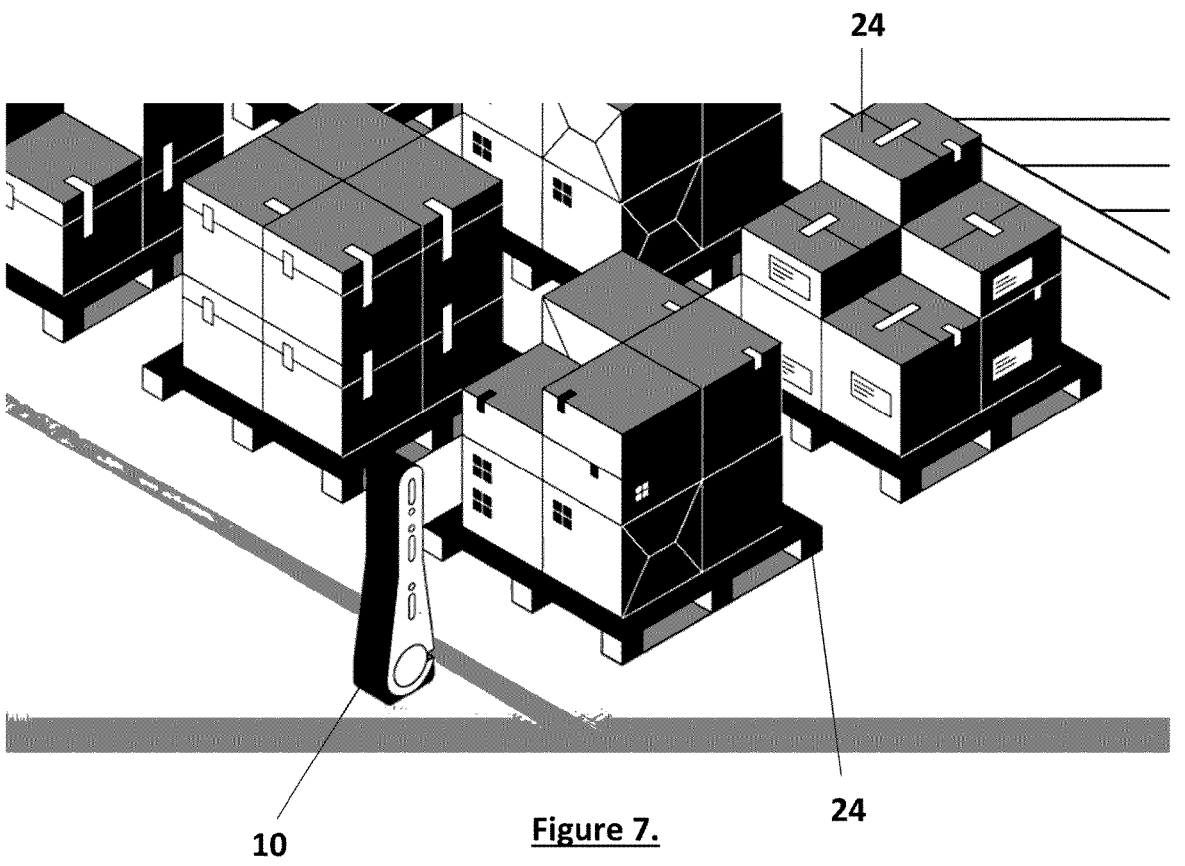

Referring to FIGS. 6 and 7, operation of the present invention will now be described. FIG. 6 illustrates a storage area such as a warehouse into which objects 24 are delivered on pallets 48 by vehicles such as lorries or trucks 50. After delivery, the palleted objects 24 are stored in storage racks 52. As can be seen in FIG. 6, and in more detail in FIG. 7, a series of eight sets of palleted objects 24 have been arranged in two rows of four objects. Once unloaded, the robots 10 are able to travel around a path 26 which encircles the eight palleted objects. In doing so, the Lidar sensors of sensor array 14B can scan the objects to determine or infer the shapes of their sides and undertake volumetric analysis.

Figure 8:
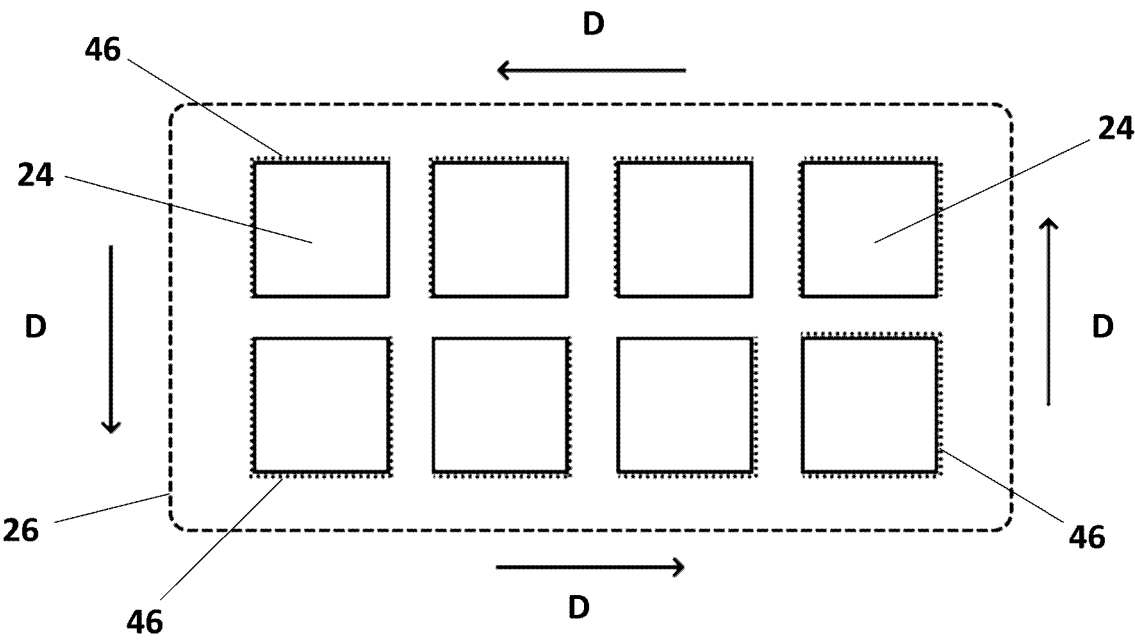
FIG. 8 is a schematic representation of a path followed by the robot and illustrating the surfaces scanned.

With additional reference to FIG. 8, the path 26 is illustrated with the robots travelling anti clockwise in the direction illustrated by the arrows D. In common with FIGS. 3 to 5, the dotted lines 46 in FIG. 8 illustrate the sides of the objects 24 which have been scanned in full or at least partial detail by reflected data points from the Lidar sensor. The sides of the objects 24 which lack the dotted lines 46 have the shape of their sides inferred from edge data gathered from the top surface 44 at its junction with those sides.

Figure 9:
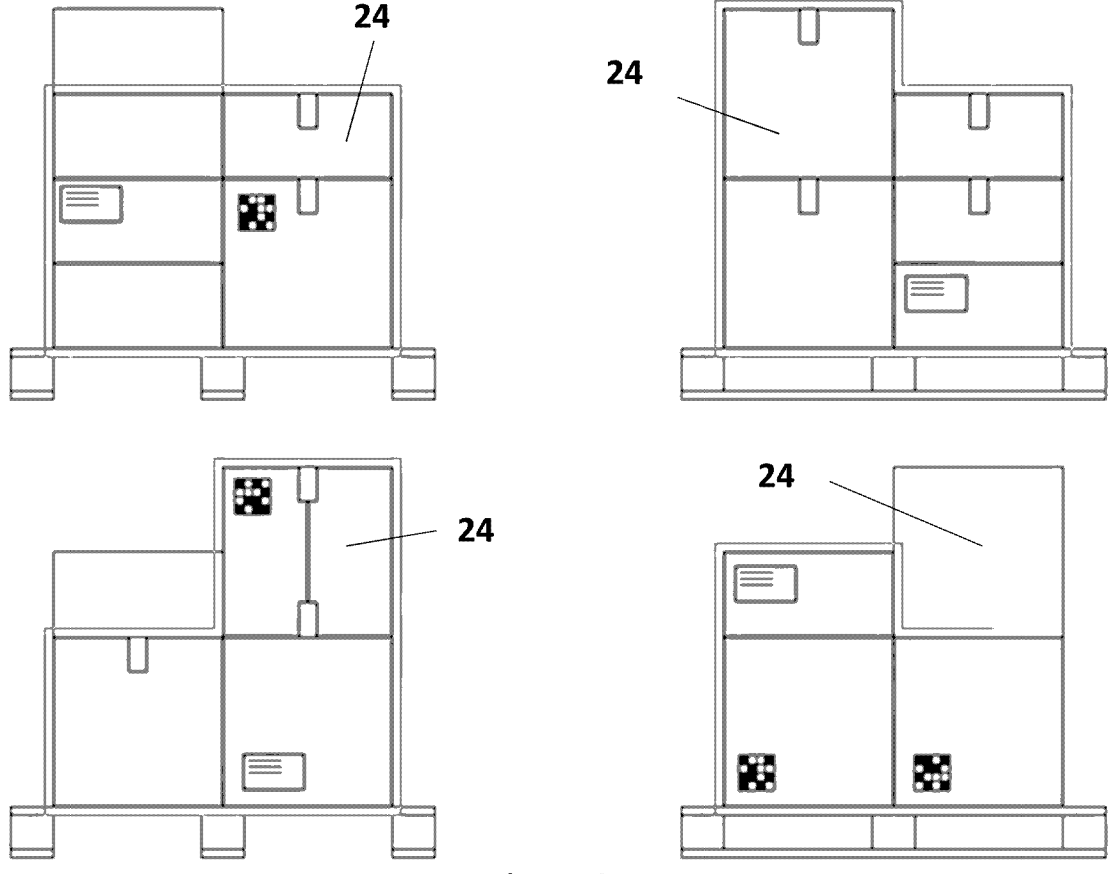
FIG. 9 is an illustration of data gathered and processed during the operation of the present invention.

Another useful aspect of the determining of volumetric information from the scanning process is illustrated in FIG. 9. By determining the shape of each side, by scanning or by inference, it is possible to undertake inventory checking to determine that the palleted objects are compliant with regulations or policies. It is also possible to detect damage or to accurately determine the condition of palleted objects on arrival at the warehouse.

Figure 10C:
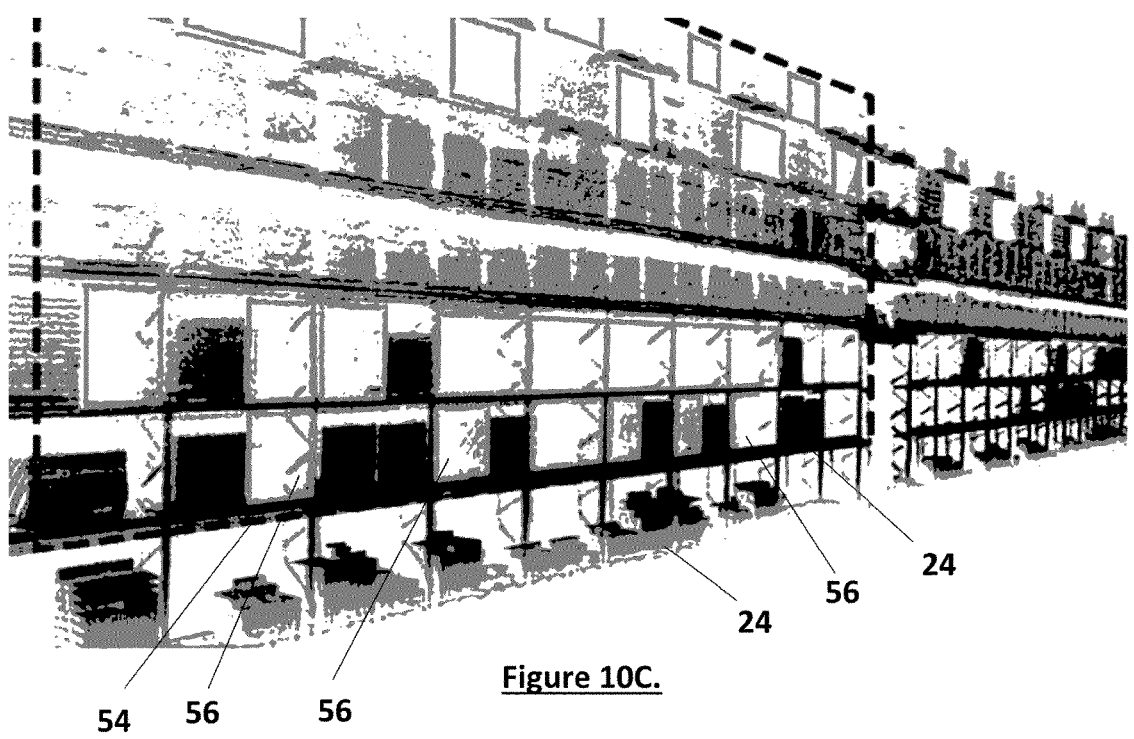
Figure 10D:
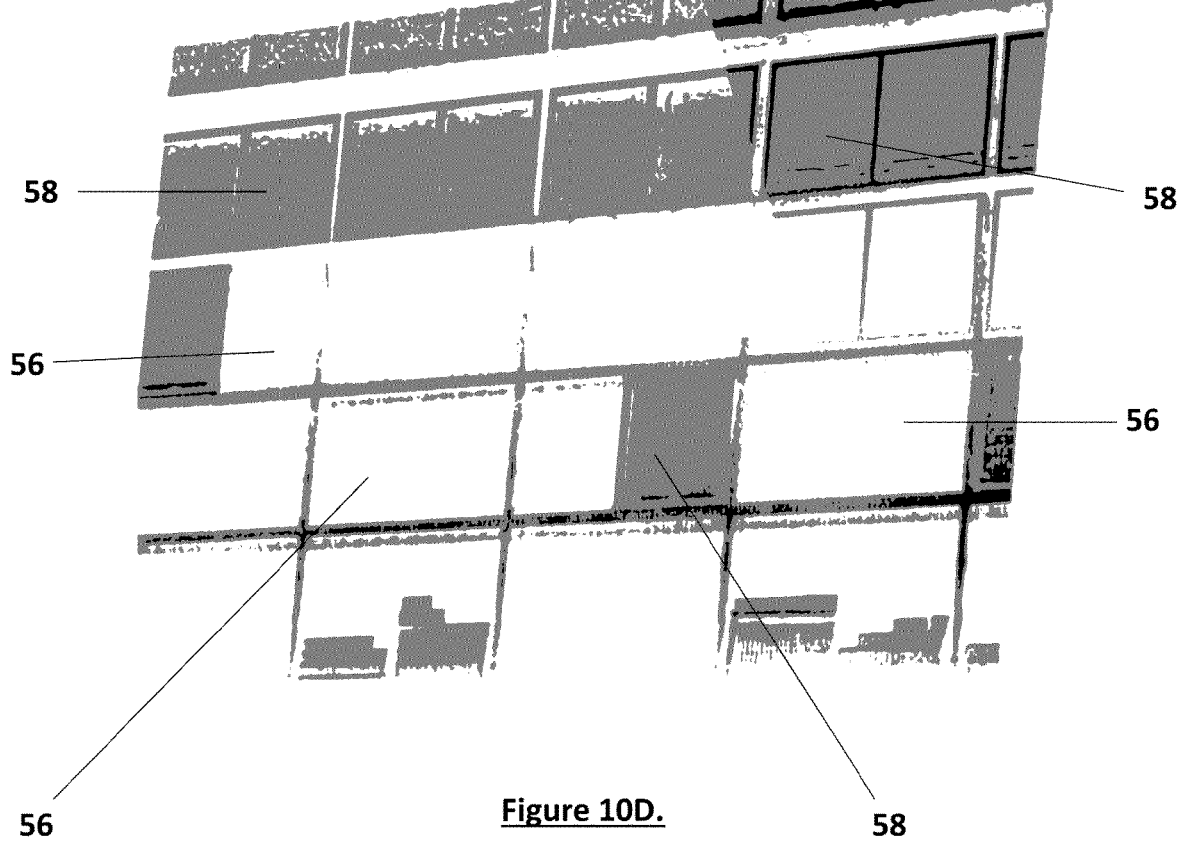

With further reference to FIGS. 10A to 10D, when the robots 10 are not being utilised for scanning palleted objects on arrival at the warehouse, or on departure, they can be used to undertake other warehouse inventorying operations. For example, the robots can travel along the rows of storage racks 52 to identify which of the storage locations in the racks are occupied and which are free to receive more palleted objects. FIG. 10A illustrates an image which is generated from the Lidar data as a robot 10 travels through a storage area, such as a warehouse, gathering the Lidar distance data relating to the storage locations in the warehouse racks. This data can be manipulated to generate the image shown in FIG. 10B and from data relating to this image an analysis of a particular portion (indicated at 54) of the data can be undertaken to identify the occupied storage locations some of which are identified with reference 56. Finally, in FIG. 10D the unoccupied storage locations 56 are identified as are the occupied storage locations (some of which are labelled 58). This data is then be used to determine where palleted objects should be stored in the warehouse. As part of the inventorying operations, optical cameras are used to identify QR, barcodes and the like on objects and linking them to their locations.

Figure 1A:
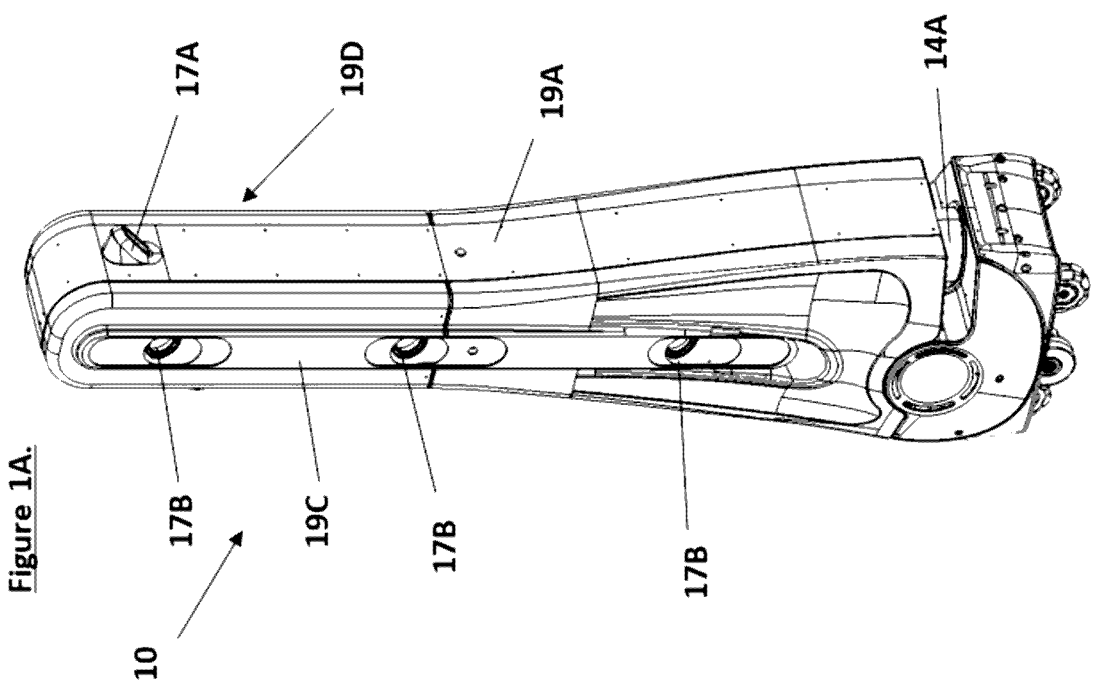

The second embodiment will now be described with initial reference to FIGS. 1A, 1B and 2 (and later reference to FIGS. 11 and 12) a method for optimising package storage utilises a robot 10 and a central processor 12. The method of the present invention can be used in many different situations where packages and the like are stored in close proximity to each other and two such examples are set out below. Firstly, a package being received and stored in a logistics warehouse for further transportation. In the second example, packages are being loaded into an aircraft hold or a transport storage container.

On arrival at a warehouse or when a package is being shipped in a container or aircraft hold, it first goes through a scanning procedure. This not only helps with identification of the package but also generates the volumetric data of the package. With this volumetric data, for every package in the warehouse a space can be found that is optimum with regards to its size and length of time it will be stored. If a package is only being stored for a short period of time an ideal location would be near or below eye level, allowing the package to be obtained quickly. Contrastingly, if the package is to be stored for a long period of time, a space in the furthermost regions of the warehouse could be suitable.

When the package is shipped via a shipping container or in the hold of an aircraft the shapes and volume of the packages have additional importance. In many cases an aircraft hold is not cuboidal in shape and can have many angled surfaces or overhangs and hence if the shapes of packages are known the maximum space can be utilised. It is also financially and environmentally beneficial to deliver as many packages in a single trip as possible. Therefore, determining the shape and volume of each package before shipping allows the central processor to generate a map of the most efficient packing arrangement.

For any scan the robot 10 moves (on wheels 16) around the package whilst recording distance from itself to the package at a plurality of heights. The locomotion and the directions that the robot needs to take are pre-programmed into the hardware (not shown) and therefore it knows what path it needs to take. However, the robot is also programmed with a high degree of autonomy meaning that if the package is larger than expected or is not placed where the robot would normally expect it to be placed, it is able to alter its path to complete its journey encircling the package. This is preferably done by ensuring that the robot remains in an ideal range of distance from the object. That is, not so close that the robot collides with the package but also close enough for efficient scanning so that its path around the package is not too long.

The robot 10, in this invention uses a scanning method called light detection and ranging (LiDAR). This technique uses light in the form of a pulsed laser to measure the distance between the emitted light on the robot and a surface on the package. A further receiver sensor on the robot measures the time it takes for the light to reflect off the surface of the package and back to the source. Both solid state and mechanical LiDAR are suitable for use in the robot 10 and other sensors and methods of distance measurement can be used including, but not limited to, RGB cameras, stereo cameras, RGB-D cameras or depth sensors.

The sensors 14 are located on the body 18 of the robot 10 that faces the package surface being scanned. As a minimum, these sensors shine the laser light onto the package, the light being substantially parallel to the floor and perpendicular to the package. Preferably the LiDAR sensors 14 (in combination with the RGBD, RGB and stereo cameras) scan in a series of, in this case three, overlapping vertical lines of data points. This ensures that the height of the package is always considered.

While the robot 10 moves around the package it records the distance between itself and the package at a plurality of locations along the path it follows. For example, scanning a package measuring 1 m$^3$ would generate around 5,000,000 distance data points. These data points are transferred to and processed in the central processor 12 and the volumetric data calculated. The volume is calculated by mapping the points on a 3D graph thereby mapping the geometry of the object as well as calculating the volume and maximum dimensions. This volumetric data is used to allocate a space in the warehouse that matches said volume. This ensures that the storage space in the warehouse is used efficiently. For example, a 1 m$^3$ package could be stored in a 1.9 m$^3$ space. However, the additional 0.9 m$^3$ space could be further used to store an additional package. When considering packages that are not perfectly cuboidal in shape, modelling exact measurements allows the central processor to arrange complex shaped packages into a single space.

To further maximise on the productivity of the storage space the length of time that a package is being stored is also taken into consideration.

Figure 2:
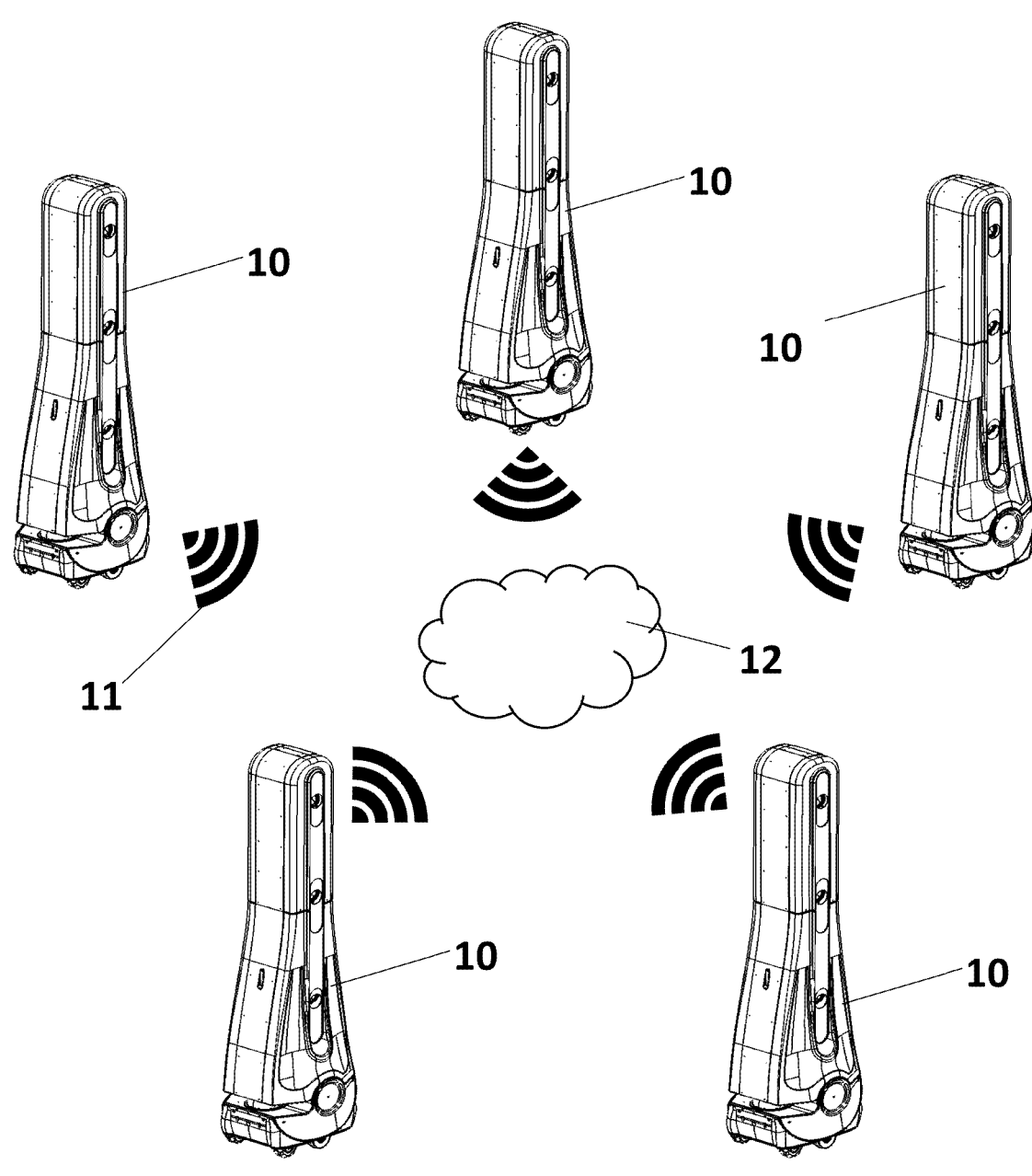
FIG. 2 is a schematic representation of the system used to implement the present invention.

As a variety of packages are delivered to the warehouse at the same time, a multitude of robots can be used simultaneously, illustrated in FIG. 2. Every robot 10 transmits their data to the central server once scanning has commenced, allowing for live feed and calculations of the distance data to be recorded and analysed. This prevents a backlog of packages needing to be scanned, and accelerates the time taken to pack a shipping container or aircraft hold.

Figure 12:
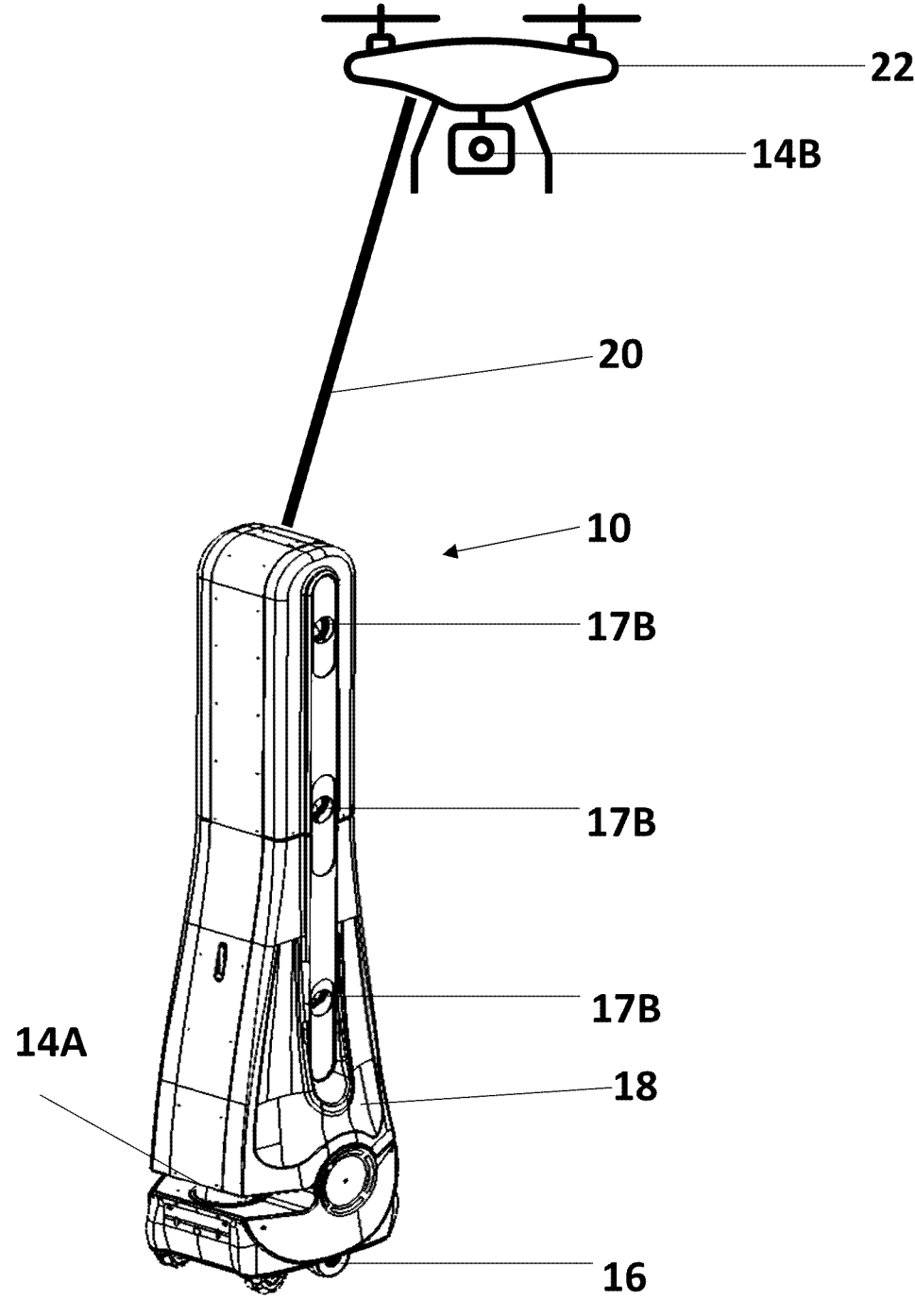
FIG. 12 is a schematic representation of a robot of another aspect of the present invention.

FIG. 12 shows a variation on the robot 10 illustrated in FIG. 1 by the addition of an unmanned aerial vehicle (UAV), in this case a drone 22, tethered to the robot 10. Additional sensors and/or cameras are situated on the drone and therefore the scanning takes place from a height in order to allow larger objects to be scanned by adding data from the drone to that data gathered from the robot. The drone uses methods such as triangulation sensor to determine its location in space and then uses LiDAR (in combination with the RGBD, RGB and stereo cameras) to measure the displacement between itself and the package, thus processing distance to calculate the required volumetric data. The drone 22 is tethered via an umbilical cable 20 that can transmit and receive data along its length from the robot to the drone, and vice versa. Although these cables are flexible during scanning, they are extended to the maximum pre-set height so that they are taut which enables the drone to keep a constant height. The drone generates images of its position above the robot and this information in combination with the robot distance to object and the height of the drone above the robot means that the distance from drone to object can be calculated.

As an alternative to the use of an unmanned aerial vehicle, the height of the distance measuring device (Lidar 14B) can be varied by mounting it on a telescopic pole in within the housing which extends from the housing. This enables the distance measuring device to "see" over and scan objects which are taller than standard. This also enables the robot 10 to be shorter in overall height than is illustrated in the figures by allowing the telescopic pole to only extend when required in scanning larger objects. It also allows for more accurate scanning of higher up parts of a warehouse's shelving system.

Where the overall height which the telescopic pole can extend is significantly greater than the height of the robot from which it is extending it is necessary to add stabilisation devices. These stabilisation devices can be passive, that is needing no active control, for example they can be elasticated cables which extend from peripheral points on the housing to the top of the telescopic pole. Such elasticated cables can be in a purely elasticated form or can be non-stretching cables mounted on springs. As the telescopic pole extends the non-stretching cables extend from storage reels which lock when the pole reaches its intended height and the springs are mounted towards the top of the cables.

Active damping can also be used. One example of this again uses cables and the extension of the cables is controlled by driven motors. Sensors, which are preferably mounted towards the top of the telescopic pole, detect movement and the motors, under the control of the processor, are able to make slight adjustments to their length in order to stabilise the robot and the telescopic pole. Another example of an active stabilisation system is to use drone-like propellers mounted at the top of the pole to apply stabilising forces to the top of the telescopic pole. Because the drone-like propellers are able to draw power from a battery fixed to the ground the forces which they can apply are significantly greater than those of a standard drone which must carry its own power supply that results in all components being made just powerful enough to undertake the operations required due to weight constraints.

Figure 11:
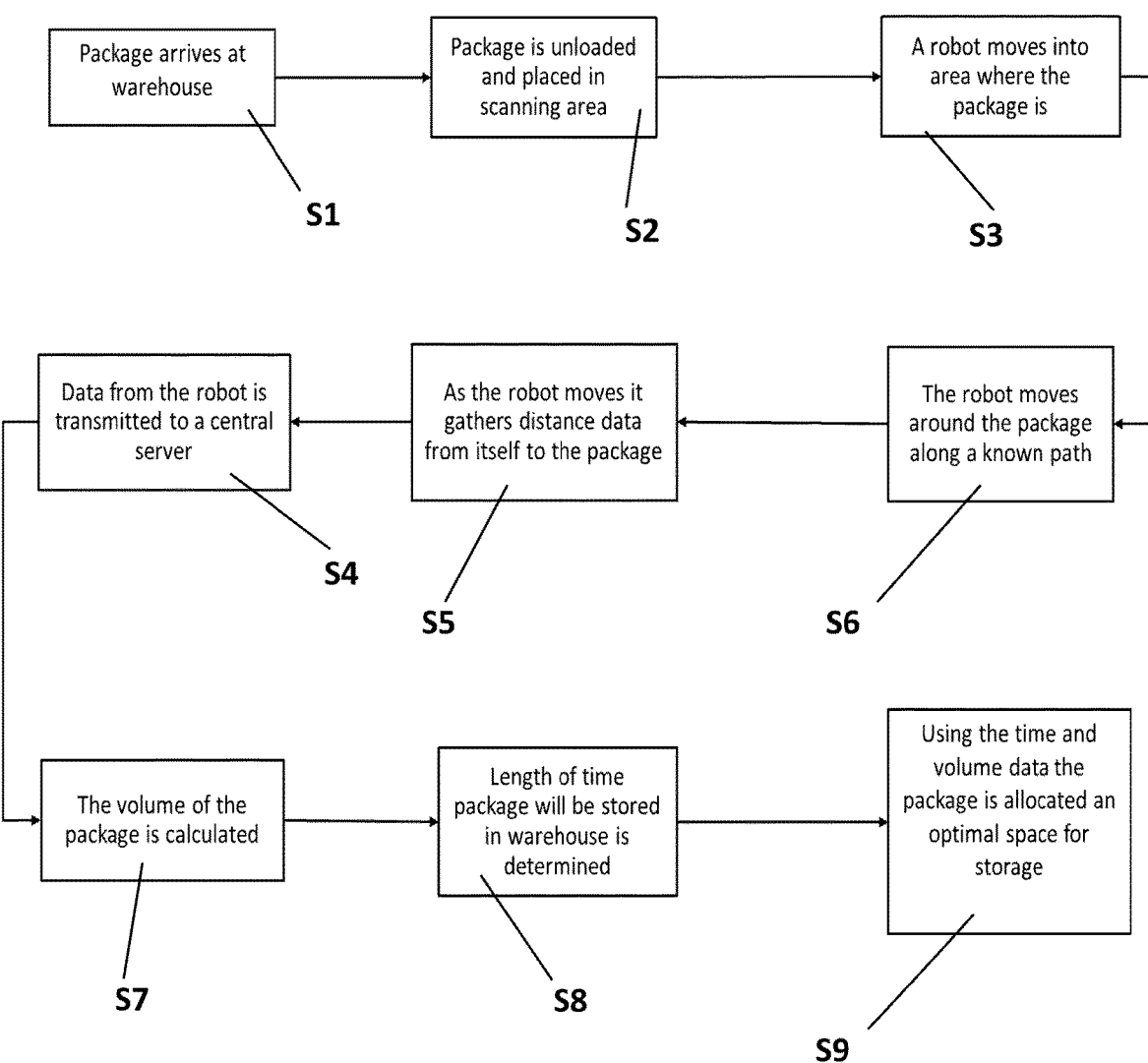
FIG. 11 is a flow chart setting out the steps of the method of the present invention.

The steps used for optimising package storage in a warehouse will now be described, with reference to FIG. 11. A package or other such deliverable arrives at the warehouse or is being readied to be transported from the warehouse (step S1). The package is unloaded and placed on a flat surface in the scanning area (step S2). The robot 10 equipped with a scanning device moves to the package within the scanning area (step S3). The robot records its starting distance and location then moves around the package along its pre-programmed path recording various data points (step S4). With each step along the path the robot measures the distance between itself and the package at a plurality of heights (step S5).

These points are then sent to the central server for further processing (step S6). To calculate the volume (step S7) the data distance points are mapped onto a 3D graph. A double integration is performed on the space within the points (ideally between two surfaces on the package), thus giving the volume of the package. It should be noted that other algorithms such as machine learning can be used to calculate the volumetric data. This data is then used, along with the time storage duration to allocate the package to a suitable storage space in a warehouse (step S8). However, when the package is being shipped via a shipping container or the hanger of an aircraft the volume and shapes of the packages are further processed. Once all the packages to be shipped have been scanned, the cumulative data is graphically mapped into 3D space. The central processor then calculates the most efficient way to fit as many packages as possible, for a given space (step S9). Using this technique, the graphical map also gives a visual guidance to employers for sorting the packages into their allocated space within the container, decreasing the amount of loading time.

It will be appreciated by persons skilled in the art that the above embodiments have been described by way of example only and not in any limitative sense, and that various alterations and modifications are possible without departure from the scope of the protection which is defined by the appended claims. For example, other methods of locomotion that could be used other than wheels are mechanical legs, spurs or track and drive sprockets. Another example includes the robot following a path marked on the warehouse floor or a person remotely controlling the robot instead of the robot being pre-programmed or autonomous. Furthermore, the data processing may be undertaken on the robot rather than being transferred to a central processor.

The invention claimed is:

1. A method for measuring and analysing packages, comprising the steps:
   placing a plurality of first packages onto a floor surface;
   locating at least one floor surface engaging robot adjacent at least one said first package;
   using a distance measuring device to gather data of distance from said robot to the first package at a plurality of heights, when in use said distance measuring device being connected to said robot in use at least 0.5 m above said floor surface;
   moving said robot from a first location to a second location around at least a portion of the first package along a path and gathering further distance data at a plurality of heights and a plurality of locations a long said path;
   using said robot locations and said distance data to generate volumetric dimensions of the first package, wherein said distance data is gathered using at least one of: a light-measurement based sensor, depth-detecting sensor, or a color-detecting based sensor.

2. A method according to claim 1, wherein said path from said first location to said second location substantially encircles said plurality of first packages and volumetric data is gathered for all said first packages.

3. A method according to claim 1, wherein said volumetric data is calculated using shape data of sides of said first package, said shape data generated from said distance data for at least two sides of said first package proximal to said path and is generated from edge data for at least one edge distal of said path.

4. A method according to claim 1, further comprising, on arrival at said second location, causing said distance measuring device to rotate towards said first package and continuing to gather distance data during said rotation.

5. A method according to claim 1, further comprising identifying an identifying tag attached to said package.

6. A method according to claim 1, further comprising comparing said volumetric dimensions to other volume data for said first packages to determine compliance and/or damage.

7. A method according to claim 1, wherein said distance measuring device is fixed to said robot at a height of at least 1.5 m above floor engaging wheels of said robot.

8. A method according to claim 1, wherein said distance measuring device comprises at least one Lidar device.

9. A method according to claim 1, wherein said placing step comprises unloading said first packages from a vehicle onto said floor surface.

10. A method according to claim 1, wherein said first package comprises a least one item located on a pallet.

11. A method according to claim 1, wherein said volumetric dimensions are generated using data from at least two substantially vertical surfaces and a top surface.

12. A method for optimising package storage for a first package in a storage area containing other packages, comprising the steps:

placing a plurality of first packages onto a floor surface;

locating at least one floor surface engaging robot adjacent at least one said first package;

using a distance measuring device to gather data of distance from said robot to the first package at a plurality of heights, when in use said distance measuring device being connected to said robot in use at least 0.5 m above said floor surface;

moving said robot from a first location to a second location around at least a portion of the first package along a path and gathering further distance data at a plurality of heights and a plurality of locations along said path;

using said robot locations and said distance data to generate volumetric dimensions of the first package, wherein said distance data is gathered using at least one of: a light-measurement based sensor, depth-detecting sensor, or a color-detecting based sensor; and using said volumetric dimensions to establish a storage location in the storage a rea area where the first package can be stored amongst the other packages.

13. A method according to claim 12, further comprising directing said robot along a storage area path in said storage area, said robot gathering distance data relating to storage locations and determining whether said storage locations are occupied or free to receive packages.

14. A method for optimising package storage for a first package in a storage area containing other packages, comprising the steps:

placing a first package in a scanning area;

gathering data of distance from a robot to the first package at a plurality of heights;

moving said robot around the first package a long a known path and gathering further distance data at a plurality of locations a long said path;

using said robot locations and said distance data to generate volumetric dimensions of the first package, wherein said distance data is gathered using at least one of: a light-measurement based sensor, depth-detecting sensor, or a color-detecting based sensor; and using said volumetric dimensions to establish a storage location in the storage area where the first package can be stored amongst the other packages.

15. The method of claim 14 wherein said distance data is gathered using at least one of LIDAR, RGBD, RGB and stereo cameras on said robot.

16. The method of claim 14, wherein said storage location is determined depending on the expected time that the package will remain in the storage area.

17. The method of claim 14 wherein scanning is implemented using an unmanned aerial vehicle (UAV) with a camera attached, wherein said UAV is tethered to said robot.

18. The method according to claim 14, further comprising identifying an identifying tag attached to said package.

19. A method according to claim 14, wherein said identification tag is a printed label and said robot includes a camera for generating images of the package, wherein said processor identifies said label from said images.

* * * * *